United States Patent [19]
Ponziani

[11] Patent Number: 6,160,476
[45] Date of Patent: *Dec. 12, 2000

[54] METHOD AND SYSTEM FOR PROVIDING AN OPTICAL SIGNAL AT THE REAR OF A VEHICLE TO WARN THE DRIVER OF A FOLLOWING VEHICLE

[75] Inventor: Richard L. Ponziani, Centerville, Ohio

[73] Assignee: ITT Manufacturing Enterprises, Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/840,473

[22] Filed: Apr. 21, 1997

[51] Int. Cl.$^7$ ........................................................ B60Q 1/44
[52] U.S. Cl. .......................... 340/479; 340/467; 340/471; 307/10.8
[58] Field of Search ..................................... 340/463, 464, 340/467, 471, 479, 903, 904, 435, 436, 466, 478; 307/10.8

[56] References Cited

U.S. PATENT DOCUMENTS

| | | |
|---|---|---|
| 4,114,957 | 9/1978 | Eichhorst ................................ 303/163 |
| 4,916,431 | 4/1990 | Gearey ................................... 340/479 |
| 4,933,666 | 6/1990 | Maple .................................... 340/479 |
| 4,952,909 | 8/1990 | Woerner et al. ........................ 340/464 |
| 4,959,634 | 9/1990 | Miller .................................... 340/467 |
| 5,091,726 | 2/1992 | Shyu ..................................... 340/904 |
| 5,111,183 | 5/1992 | Wang et al. ............................ 340/479 |
| 5,139,115 | 8/1992 | Browne et al. ......................... 340/463 |
| 5,219,218 | 6/1993 | Iino ...................................... 340/479 |
| 5,231,373 | 7/1993 | Freeman et al. ........................ 340/467 |
| 5,376,918 | 12/1994 | Vinceguerra et al. .................. 340/479 |
| 5,663,707 | 9/1997 | Bartilucci .............................. 340/479 |
| 5,838,259 | 11/1998 | Tonkin .................................. 340/479 |

Primary Examiner—Jeffery A. Hofsass
Assistant Examiner—Van T. Trieu
Attorney, Agent, or Firm—J. Gordon Lewis

[57] ABSTRACT

The present invention relates to a method and a system for providing an optical signal at the rear of a vehicle to warn the following traffic of an ongoing electronic control intervention in the vehicle behavior. Such an electronic control function can be for instance ABS, TCS or automatic yaw control. A preferred embodiment of the invention utilizes the center brake light of a vehicle to emit an intermittent optical signal during electronic control. In case of ABS, the two side brake lights shine continuously to indicate a brake pedal actuation while the center brake light flashes in an on/off-mode according to the electronic antilock control.

9 Claims, 1 Drawing Sheet

METHOD AND SYSTEM FOR PROVIDING AN OPTICAL SIGNAL AT THE REAR OF A VEHICLE TO WARN THE DRIVER OF A FOLLOWING VEHICLE

BACKGROUND OF THE INVENTION

The present invention relates to a method for providing an optical signal appearing at the rear of a vehicle to warn the driver of a following vehicle.

Such an optical signal is, for instance, a brake light indicating a brake pedal actuation. Brake lights are prescribed for all automotive vehicles. In some countries, for four-wheeled vehicles even a third, central, brake light is required. The purpose is to provide the following traffic with the information of an imminent or ongoing deceleration.

Nowadays, a majority of vehicles is equipped with an electronic control system comprising at least one of the following functions: antilock brake system (ABS), traction control system (TCS), automatic yaw control (AYC). All these functions influence the behavior of the vehicle without a respective driver's action. While ABS reduces the brake force of individual wheels during a pedal actuated braking operation when the applied brake force threatens to lock a wheel, the other electronic control systems are capable of applying a brake force to selected or all wheels under certain conditions according to preestablished control algorithms. Thus, a deceleration of the vehicle can occur, either due to an improved brake efficiency during a pedal-actuated brake operation supported by ABS or due to a so-called "active" brake operation through TCS or AYC operation provoked by excessive traction slip or unstable vehicle behavior during cornering. In each case, such vehicle deceleration may not be expected by the driver of a vehicle behind the decelerating vehicle.

To provide a warning for the driver of a following vehicle, German patent No. 43 05 186 proposes an additional warning light at the rear of a vehicle to be switched on dependent on a hazard value. The hazard value is derived by time integration of the current vehicle deceleration over a certain time period. If the hazard value exceeds a certain threshold, the warning light is activated and remains shining until the hazard value has decreased again. During ABS control, the deceleration is multiplied by an amplification factor so that the threshold is reached earlier than without ABS intervention.

According to German patent No. 43 05 186, for deriving the hazard value, the vehicle is equipped with an additional accelerometer for measuring the vehicle deceleration, which causes additional costs.

While a deceleration-dependent warning is an asset compared to only pedal-actuated brake lights, it is disadvantageous that, on the one hand, the warning light will always shine up even when a deceleration occurs entirely due to driving uphill or to braking forces that are normal for the circumstances and can be easily foreseen by following drivers. In such cases, no additional warning is needed. On the other hand, no warning will be given by known systems in situations that require an intervention of an AYC or TCS. For instance, if a vehicle is equipped with an AYC, an inadequate cornering maneuver can be compensated by selective brake application of the inner rear wheel in case of understeering and of the outer front wheel in case of oversteering. By the driver of a following vehicle driving in the same manner, but without such an automatic control function, the cornering maneuver is approached without advance notice of a dangerous condition, and the driver has no reason to reduce speed since the vehicle ahead manages the situation without a sign of instability. For the following vehicle, however, the same behavior can be fatal. Similar considerations apply for low-friction road surfaces when only an intervention of TCS can maintain a sufficient traction.

OBJECT OF THE INVENTION

An object of the present invention is to provide a method for an improved optical warning at the rear of a vehicle in situations that can be hazardous for the following traffic.

Another object of the invention is to provide such a warning method which does not cause an overflow of warnings resulting in a reduced attention or even unnecessary distraction of following drivers.

Still another object of the invention is to provide a low-cost system performing the method above.

SUMMARY OF THE INVENTION

These objects are achieved by an optical signal at the rear of the vehicle appearing during intervention of an electronic controller influencing the vehicle behavior. The driver of a following vehicle is always warned when a situation occurs which has activated electronic support. If the following vehicle is not equipped with an electronic controller, the warning appears sufficiently early to provoke an appropriate driver's reaction which can prevent serious accidents.

The influence that activates the optical signal can be electronic brake control as well as electronic reduction of the driving torque, for instance throttling a combustion engine, for this measure also causes a vehicle deceleration.

It is not to be feared that the optical warning according to the invention might result in an overflow of information with the effect that such a warning is ignored, for an electronic control of the vehicle behavior is always an exceptional intervention occurring only in very rare cases and deserves the attention of the following driver.

An even higher degree of safety is achieved if the signal generated during electronic control differs from the standard brake light. This increases the information level of the following traffic since an inappropriate way of driving can be distinguished from a normal brake pedal actuation.

Such a signal can be provided by a separate light completely independent from the brake light or by one or more brake lights shining in a different mode such as flashing during electronic control. The latter is a very inexpensive way to increase the information level of the following traffic because no additional lights are necessary. This allows the invention to be installed as an add-on system for new and used vehicles.

BRIEF DESCRIPTION OF THE DRAWINGS

A preferred embodiment of the invention is described with the aid of two drawings. In the drawings.

DETAILED DESCRIPTION OF THE DRAWINGS

Figure 1:
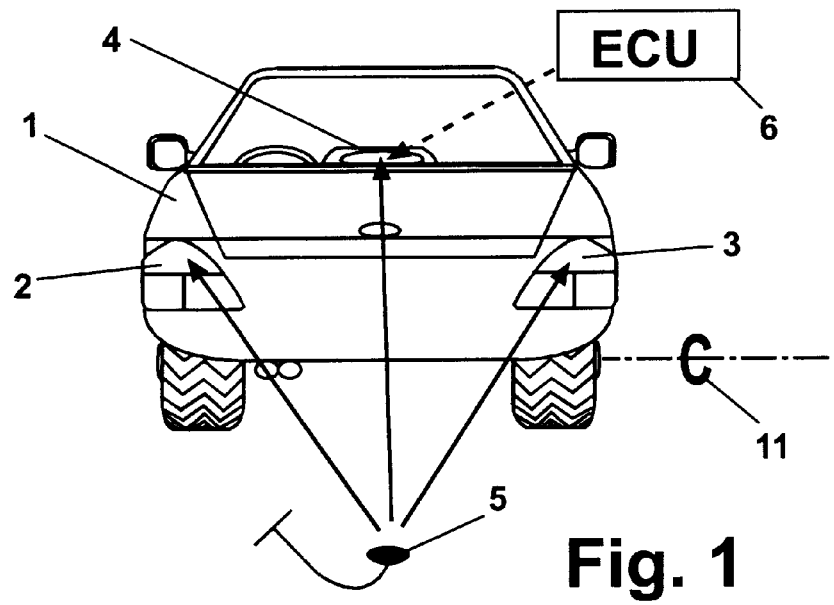
FIG. 1 shows the rear of a vehicle equipped with a device according to the invention.

In FIG. 1, a vehicle 1 is equipped with brake lights 2, 3 and 4 for indicating an actuation of a brake pedal 5, here shown outside the vehicle in order to simplify the drawing. The third light 4 (preferably a brake light) is located in a central, higher position compared to the two other brake lights 2 and 3 located one on each side. An electronic control unit 6, capable of influencing the vehicle behavior by means of ABS, TCS and AYC, has no impact on the two brake lights 2 and 3, but only on the center brake light 4, although it would be feasible to have all three brake lights 2, 3 and 4 influenced by the controller. The solid arrows pointing from the brake pedal 5 to the brake lights 2, 3 and 4 imply a constant signal while the brake pedal 5 is depressed. The dashed line of the arrow pointing from the electronic control unit 6 to the center brake light 4 implies an intermittent signal appearing whenever an electronic control of the vehicle behavior is carried out. The electronic control may influence either or both of braking forces and driving torque of the drive unit.

Figure 2:
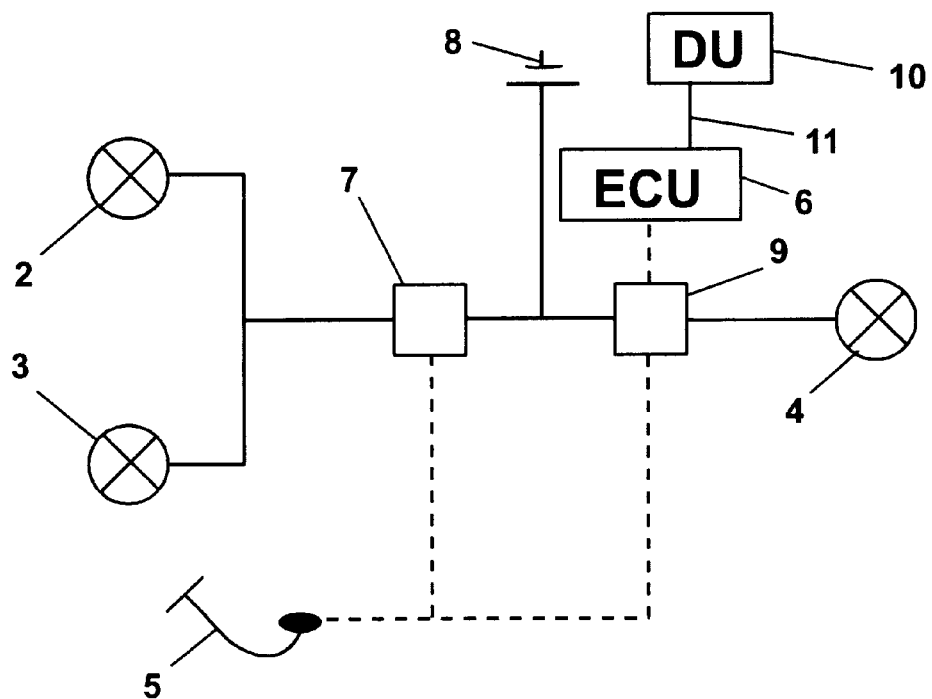
FIG. 2 shows a simplified schematic structure of such a warning device.

A simplified plotting of the system is shown in FIG. 2. The brake pedal 5 acts on a first relay 7 connecting the brake lights 2 and 3 to a power source 8. This relay 7 is of a comparably simple structure such as a brake light switch of known implementations. It works in the known way, switching the brake lights 2 and 3 on while the brake pedal 5 is depressed.

The center brake light 4 is connected to the power source 8 via a second relay 9. This second relay 9 is controlled by the brake pedal 5 as well as by the electronic controller 6. Within this relay 9, the electronic controller 6 has priority over the brake pedal 5. Thus, the center brake light 4 will show the standard brake signal during normal pedal-actuated braking as long as no electronic intervention is necessary. As soon as the electronic controller 6 influences the vehicle behavior, the center brake light 4 will generate an intermittent signal while the two other brake lights 2 and 3 continue their standard signal. Should the ABS control finish during brake pedal actuation, the center brake light 4 returns to the standard brake signal. If the ABS control continues until the brake pedal 5 is released, the signal indicating an electronic control will go out at the same time as the two side brake lights 2 an d 3.

If an electronic control takes place without a simultaneous actuation of the brake pedal 5, only the center brake light 4 will send an intermittent signal while the two side brake lights 2 and 3 are not activated.

Suitable frequencies for the intermittent signal are in a range of 1 to 10 Hz.

Though only one certain embodiment has been described, the invention is not limited to the features set forth above. More than one or even all brake lights can send the signal for electronic control. This signal can as well appear as alternating flashes changing between the center brake light 4 and the two side brake lights 2 and 3 which may shine at the same time or one after the other. The signal itself can comprise a change of the light color, intensity or shape. A change of the signal shape does not only include a flashing on/off-mode, but also, for instance, a hi/low-mode or a hi/low/off-mode. The signal for electronic control can be superimposed on the continuous standard brake signal.

What is claimed is:

1. A method for providing an optical warning signal at a rear of a vehicle having a plurality of brake lights, the plurality of brake lights being responsive to operator-induced actuation of a brake and also responsive to an electronic controller that conducts non-operator induced actuation of the brake, said method comprising:

in a first operation mode, operating at least one of the plurality of the brake lights in a first manner in response to operator-induced actuation of the brake; and in a second operation mode,
generating a control signal indicating non-operator induced actuation of the brake by the electronic controller;
providing the control signal to at least one of the brake lights; and
operating at least one of the plurality of brake lights in a second manner, different from the first manner, as an optical warning signal in response to the control signal, the optical warning signal indicating activation of the electronic controller and therefore non-operator induced actuation of the brake to an observer behind the vehicle.

2. A method according to claim 1, wherein, in the second operation mode, the optical warning signal is generated by flashing the at least one of the plurality of brake lights.

3. In a vehicle equipped with a plurality of brake lights operable in a first mode in response to operator induced actuation of a brake and operable in a second mode in response to non-operator induced actuation of the brake by an electronic controller, a system for providing an optical warning signal [appearing] at a rear of the vehicle, the system comprising a power source and having a communication path between the power source and at least one but less than all of the plurality of brake lights, said communication path including a relay configured and arranged to couple the power source to the at least one but less than all of the plurality of brake lights in response to a control signal generated by said electronic controller indicating non-operator induced actuation of the brakes by the electronic controller to operate the brake lights in the second mode to generate the optical warning signal.

4. A system, according to claim 3, wherein one of said plurality of brake lights is a center brake light.

5. A system, according to claim 3, wherein the electronic controller is configured and arranged to generate the control signal to switch the relay into a flash mode such that the at least one but less than all of the plurality of brake lights flash when operating in the second mode.

6. For use in a motor vehicle equipped with at least one electronic vehicle control system that can actuate a brake without an operator actuating a brake pedal, an accident avoidance system for alerting an observer outside the motor vehicle to the possibility of a potentially dangerous driving condition, said accident avoidance system comprising:

at least one brake light, said at least one brake light being operable in a first mode responsive to operator induced actuation of the brake and a second mode responsive to non-operator induced actuation of the brake, wherein said at least one brake light turns on differently between the first and the second modes;

an electronic controller for said electronic vehicle control system, the electronic controller configured and arranged to generate a control signal indicating non-operator induced actuation of the brake by the electronic vehicle control system; and means for turning on said at least one brake light in the second mode in response to the control signal to indicate non-operator induced actuation of the brake.

7. A system as claimed in claim 6 wherein said means for turning on said warning light provides intermittent power to said light to provide a flashing warning signal.

8. A system as claimed in claim 6, wherein the vehicle is equipped with a plurality of brake lights operable in the first mode and the second mode, and wherein at least one brake light turns on when the plurality of brake lights operates in the second mode.

9. A system as claimed in claim 8, wherein less than all brake lights turns on when the plurality of brake lights is operated in the second mode.

\* \* \* \* \*